United States Patent
Loevinger (12)

(10) Patent No.: US 6,347,589 B1
(45) Date of Patent: Feb. 19, 2002

(54) RAILWAY TANK CAR HAVING A HEATING SYSTEM WITH INTERNAL HEAT TRANSFER PANEL

(75) Inventor: Richard P. Loevinger, Sioux Falls, SD (US)

(73) Assignee: TRN Business Trust, Dallas, TX (US)

( * ) Notice: Subject to any disclaimer, the term of this patent is extended or adjusted under 35 U.S.C. 154(b) by 0 days.

(21) Appl. No.: 09/609,097

(22) Filed: Jun. 30, 2000

(51) Int. Cl.7 .................................................. B61D 5/00
(52) U.S. Cl. ........................ 105/358; 105/360; 105/451; 280/837
(58) Field of Search ................................ 105/360, 358, 105/451; 280/837, 838, 839; 165/41, 348, 351, 353, 132

(56) References Cited

U.S. PATENT DOCUMENTS

| | | | | |
|---|---|---|---|---|
| 3,228,466 A | * | 1/1966 | Carleton | 165/348 |
| 3,595,307 A | * | 7/1971 | Mowatt-Larssen | 165/47 |
| 3,685,458 A | * | 8/1972 | Price et al. | 105/358 |
| 3,742,866 A | * | 7/1973 | Needham et al. | 105/360 |
| 4,414,462 A | * | 11/1983 | Price | 219/202 |
| 4,476,788 A | * | 10/1984 | Loevinger | 105/451 |
| 4,480,370 A | | 11/1984 | Loevinger | 29/401 |
| 4,502,392 A | * | 3/1985 | Rosenberger | 105/451 |
| 4,530,288 A | | 7/1985 | Loevinger | 105/358 |
| 4,603,733 A | | 8/1986 | Loevinger | 165/41 |
| 4,624,189 A | | 11/1986 | Loevinger | 105/451 |
| 5,020,447 A | | 6/1991 | Loevinger | 105/451 |
| 5,058,511 A | * | 10/1991 | Loevinger | 105/451 |
| 5,467,719 A | | 11/1995 | Dalrymple et al. | 105/362 |

OTHER PUBLICATIONS

"GATX Tank Car Exterior Heater Coil System" GATX Transportation Bulletin, TB–80–1, 06/80.*

"GATX Tank Car Exterior Heater Coil System" *GATX Transportation Bulletin,* TB–80–1, 06/80, Jun. 1980.

* cited by examiner

*Primary Examiner*—S. Joseph Morano
*Assistant Examiner*—Frantz F. Jules
(74) *Attorney, Agent, or Firm*—Baker Botts L.L.P.

(57) ABSTRACT

In one embodiment of the present invention, a railway tank car including a tank coupled with first and second stub sill assemblies may be provided. The stub sill assemblies may each be coupled with associated railway car truck assemblies. A tank defined in part by a generally elongate hollow cylinder having first and second heads with first and second heads mounted upon the first and second heads, respectively, may also be provided. In a particular embodiment, one or more heat transfer panels may be disposed within the cylinder adjacent the first and second heads. In another embodiment, first and second support members may be disposed within the cylinder, and intermediate a midpoint of a longitudinal centerline of the tank, and each respective head. Each support member may provide support for, and maintain their respective heat transfer panels in a spaced relation with a lower portion of the cylinder.

20 Claims, 5 Drawing Sheets

RAILWAY TANK CAR HAVING A HEATING SYSTEM WITH INTERNAL HEAT TRANSFER PANEL

TECHNICAL FIELD OF THE INVENTION

This invention relates in general to the field of railway tank cars and, in particular, to a railway tank car having a lading heating system.

BACKGROUND OF THE INVENTION

Railway tank cars may be used to move hazardous and non-hazardous liquid or semi-liquid bulk freight of all types including, but not limited to: liquified petroleum gases; liquified gases (e.g., carbon dioxide); chemical intermediates; polymers; antiknock compounds; anhydrous ammonia; chlorine, alcohol, vegetable and fish oils; fruit juices; wine and syrups. Modern tank cars are typically designed without center sills and rely on the structural strength of the tank to transmit draft and buffing forces. Many of the tank cars currently in use can carry in excess of one hundred tons and often have a thirty-thousand gallon capacity. Tank cars which are either heated, pressurized, lined, or a combination of these features, are available to shippers.

Heated tank cars may be used to carry liquids which are highly viscous at low temperatures. Heating panels, internal pipes, or heating coils, may be applied within or external to the tank car in order to increase the temperature of the lading, during unloading operations. These panels, coils or pipes may be fed by a heating fluid such as steam, hot water or hot oil.

Heating panels, and their associated piping and coils which carry the heating fluid, decrease the capacity of the railway car by decreasing the available volume within the tank. The specific configuration of heating panels and associated coils may also affect the performance of the tank car during unloading. For example, many tank cars distribute heat disproportionately to the contents of the car. Accordingly, a portion of the contents may become overheated, which may be detrimental to certain liquids which may solidify or caramelize. Underheated contents will not unload efficiently. A combination of these factors may lead to a phenomenon referred to as "heel" wherein solidified contents remain within the car after unloading and decrease the overall capacity of the car. Heel is also detrimental to heat transfer of the piping and coil system and may contaminate subsequent lading within the tank car.

Traditional interior piping and exterior coil configurations do not efficiently distribute the heating fluid throughout the system. Furthermore, improper drainage of the heating fluid and/or condensate by-product can lead to failure of the heating system.

SUMMARY OF THE INVENTION

In accordance with teachings of the present invention, disadvantages and problems associated with previous heated railway tank cars have been substantially reduced or eliminated.

In one embodiment of the present invention, a railway tank car including a tank coupled with first and second stub sill assemblies may be provided. The stub sill assemblies may each be coupled with associated railway car truck assemblies. A tank defined in part by a generally elongate hollow cylinder having first and second ends with first and second heads mounted respectively thereon, may also be provided. In a particular embodiment, one or more heat transfer panels may be disposed within the cylinder adjacent the first and second heads. Each of the heat transfer panels may communicate with respective pluralities of heat transfer ducts, operable to provide a heating medium to the first and second heat transfer panels.

In another embodiment, a first support member may be disposed within the cylinder, intermediate a discharge valve of the tank, and head. A second support member may also be disposed within the cylinder, intermediate the discharge valve and an opposing head. Each support member may provide support for, and maintain their respective heat transfer panels in a spaced relation with a lower portion of the cylinder.

In still another embodiment, each support member may comprise an arcuate shaped bar disposed axially along the lower portion of the cylinder along a plane approximately perpendicular to a longitudinal centerline of the cylinder. Alternatively, each support member may comprise a generally arcuate shaped angle disposed in a similar manner as described above with respect to the bar.

In yet another embodiment, each heat transfer duct may be disposed upon an exterior portion of the cylinder, being in fluid communication with the heat transfer panels.

A technical advantage of the present invention includes a lading heating system which minimizes any reduction in available volume for carrying lading in the tank car. The reduced size of the heat transfer panels and the exterior location of the heat transfer ducts provides for maximum capacity of the interior of the tank. Also, placing the heat transfer ducts on the exterior of the tank maximizes heat transfer at the bottom of the tank and increases the efficiency of the heating system. This allows for a reduction in overall weight of the heating system, thereby increasing payload capacity.

Another technical advantage of the present invention includes the increased strength of the railway tank car provided by the installation of the support members, heat transfer ducts, coils and heat transfer panels. The location of the support members on the tank shell, near the heads, provides support to the tank where the highest train loads are supplied to the tank, at the end of the draft sill. Also, the ducts, coils and heat transfer panels provide support and increase the moment of inertia of the tank.

Still another technical advantage of the present invention includes the increased duct width and reduced duct height which spread the heating media into a thin film over a larger area, thereby increasing the heat transfer efficiency. The increased duct width also reduces the number of ducts required to efficiently cover the desired heating surface.

Yet another technical advantage of the present invention includes the reduction and/or elimination of heel. Accordingly, heat transfer is accomplished more efficiently without the loss of volume typically accompanied by heel, and lading contamination is substantially reduced.

Other technical advantages are readily apparent to one of ordinary skill in the art from the following figures, descriptions, and claims.

BRIEF DESCRIPTION OF THE DRAWINGS

A more complete understanding of the present invention may be acquired by referring to the following description taken in conjunction with the accompanying drawings in which like reference numbers indicate like features and wherein.

DETAILED DESCRIPTION OF THE INVENTION

The present invention and its advantages are best understood by referring to FIGS. 1–13 of the drawings, like numerals being used for like and corresponding parts of the drawings.

Figure 1:
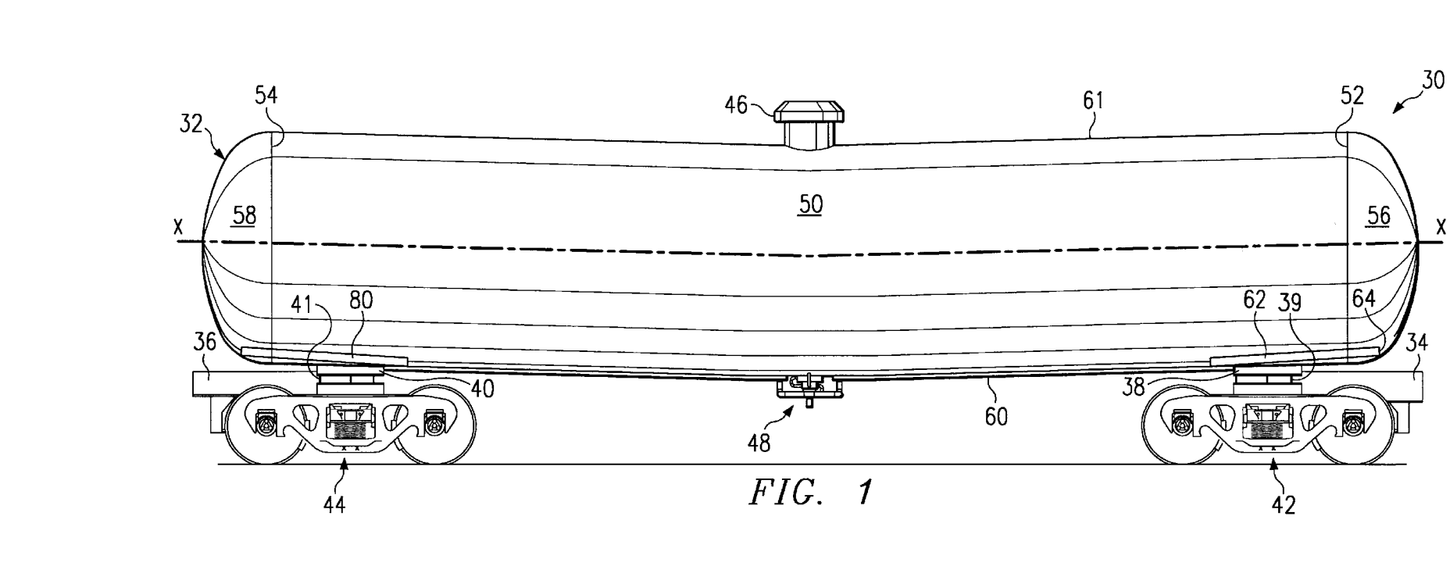
FIG. 1 is a schematic drawing illustrating a side view of a railway tank car incorporating teachings of the present invention.
Figure 2:
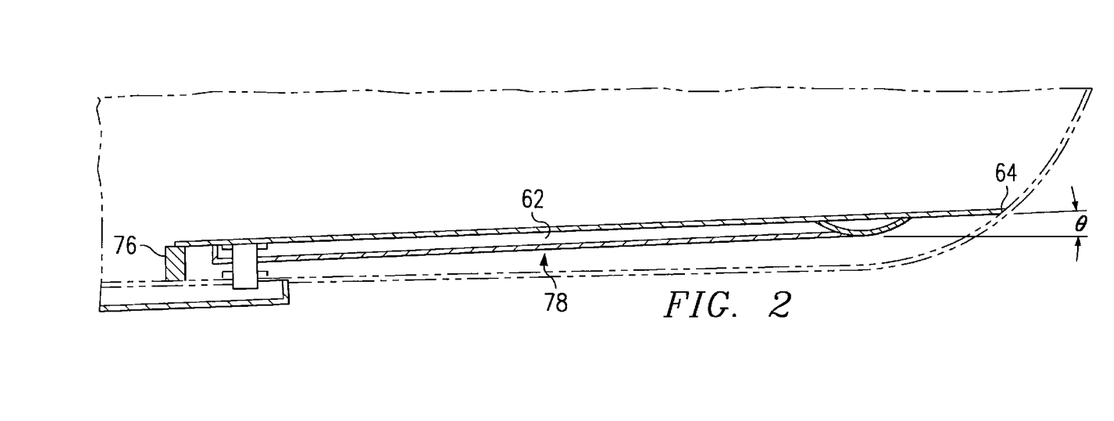
FIG. 2 is a schematic drawing with portions broken away illustrating a cross-section of a portion of the railway tank car of FIG. 1.
Figure 2A:
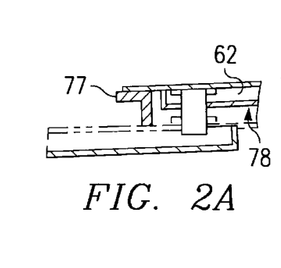

Referring to FIG. 1, a railway tank car is provided and generally designated by the reference numeral 30. Tank car 30 includes a tank 32 mounted upon a pair of stub sill assemblies 34 and 36. A tank cradle 38 couples tank 32 with body bolster 39. Similarly, tank cradle 40 couples tank 32 with body bolster 41. Body bolsters 39 and 41 are coupled with truck assemblies 42 and 44, respectively. The structural strength of tank 32 may be relied upon to transmit draft and buffing forces from the ends of the draft sills to tank 32.

Tank car 30 of the present invention may be used to transport a variety of hazardous and non-hazardous liquid or semi-liquid bulk commodities of all types. Liquid commodities may be loaded within tank 32 through an associated tank manway 46. Unloading of the lading may be accomplished by gravity-flow through discharge valve 48. In another embodiment, the discharge valve may be located practically anywhere upon tank 32, for example, upon upper portion 61 of tank 32. Tank 32 may also be pressurized to assist in unloading of the lading. Tank car 30 includes various safety appliances including, but not limited to ladders, handholds, rails, steps, operating platforms and safety valves. Depending upon the specific application and/or the type of commodity involved, tank car 30 may be heated, pressurized, lined or any combination of these features. For example, when tank car 30 is used to transport lading which is highly viscous at low temperatures, tank car 30 may be heated in order to efficiently discharge the lading through discharge valve 48.

Tank 32 is generally defined by an elongated hollow cylinder 50 having a first end 52 and a second end 54. At the lower portion of cylinder 50, tank 32 may slope gradually toward discharge valve 48 from each head 56 and 58. Similarly, the configuration and slope of an upper portion 61 of cylinder 50 may conform to the configuration and slope of lower portion 60. A head 56 is disposed upon cylinder 50 at first end 52. Similarly, a head 58 is disposed upon second end 54 of cylinder 50. Heads 56 and 58, and cylinder 50 at least partially define generally enclosed tank 32 and protect lading contained therein from ambient environment. Discharge valve 48 may be disposed upon tank 32 intermediate end heads 56 and 58 on a lower portion 60 of cylinder 50. Manway 46 may be disposed upon an upper portion of cylinder 50, also intermediate heads 56 and 58.

Figures 3, 4, 5, 6:
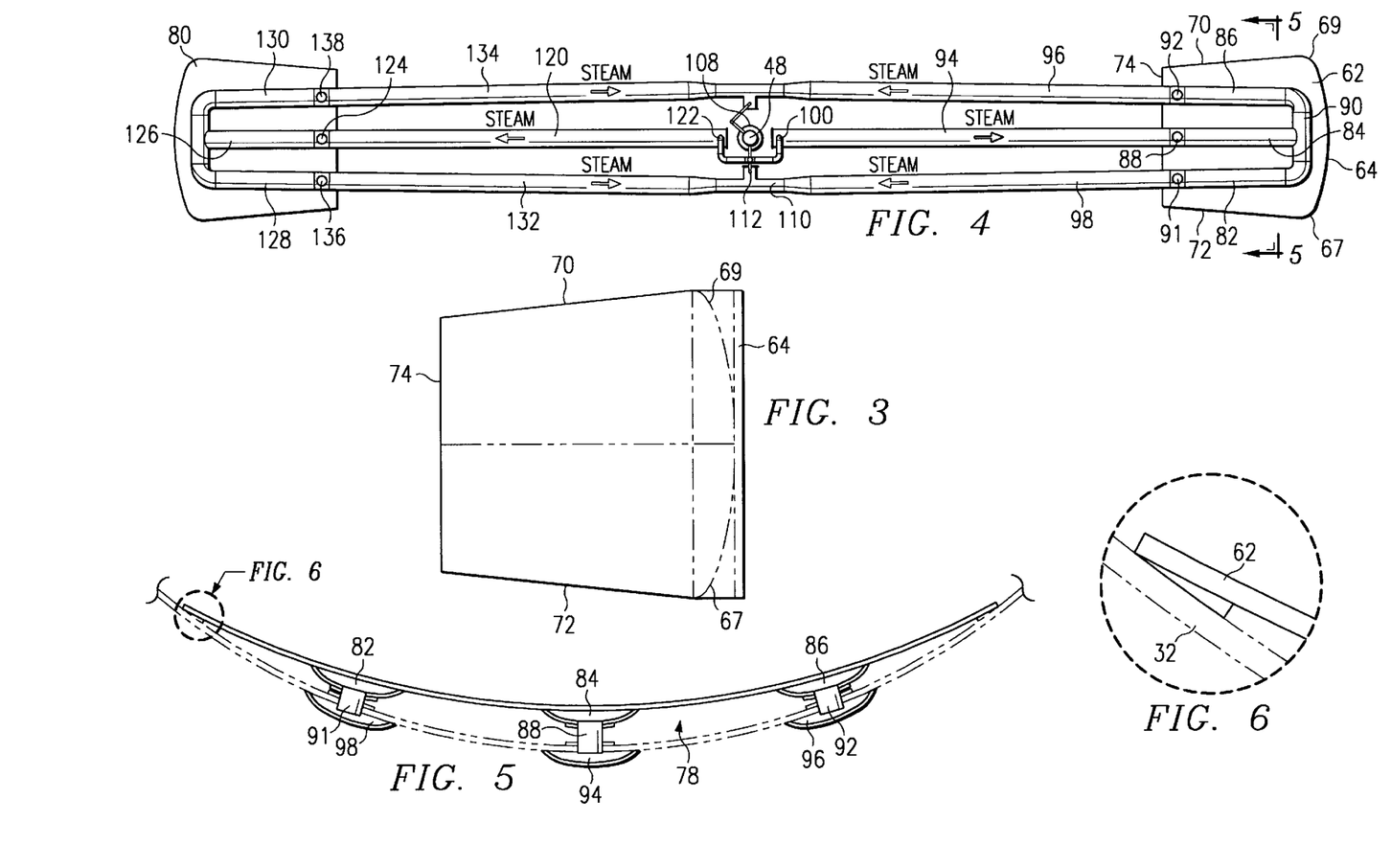
FIG. 3 is a schematic drawing illustrating a top view of a heat transfer panel for use within the teachings of the present invention.
FIG. 4 is a schematic drawing with portions broken away illustrating heat transfer panel and piping configurations of the railway tank car of FIG. 1.
FIG. 5 is a schematic drawing with portions broken away illustrating a cross-section through line 5—5 of FIG. 4.
FIG. 6 is a schematic drawing with portions broken away illustrating a connection between a heat transfer panel and railway tank car.

Referring now to FIGS. 1–4, a heat transfer panel 62 may be disposed within tank 32 adjacent head 56. A top view of heat transfer panel 62 is illustrated in FIG. 3. Heat transfer panel 62 includes a first end 64 which may contact head 56 adjacent to and spaced both horizontally and vertically from lower portion 60 of cylinder 50. First end 64 of heat transfer panel 62 may be secured to head 56 by welding. Edges 67 and 69 of heat transfer panel 60 may include forty-five degree chamfers to form "knife-edges," at the point of contact with first end 52 of cylinder 50, and head 56.

Heat transfer panel 62 generally tapers inward along walls 70 and 72 from first end 64 to second end 74. Second end 74 is generally spaced from lower portion 60 of cylinder 50, and supported by a back support 76. The height of back support 76 may be selected to allow heat transfer panel 62 to slope downward from first end 64 to second end 74, toward discharge valve 48. Accordingly, an angle θ is formed between heat transfer panel 62 and an imaginary longitudinal horizontal central axis X of cylinder 50. The slope of heat transfer panel 60, defined by angle θ, promotes flow of liquid lading within tank 32 from first end 52 toward discharge valve 48 during unloading.

Figures 12, 13:
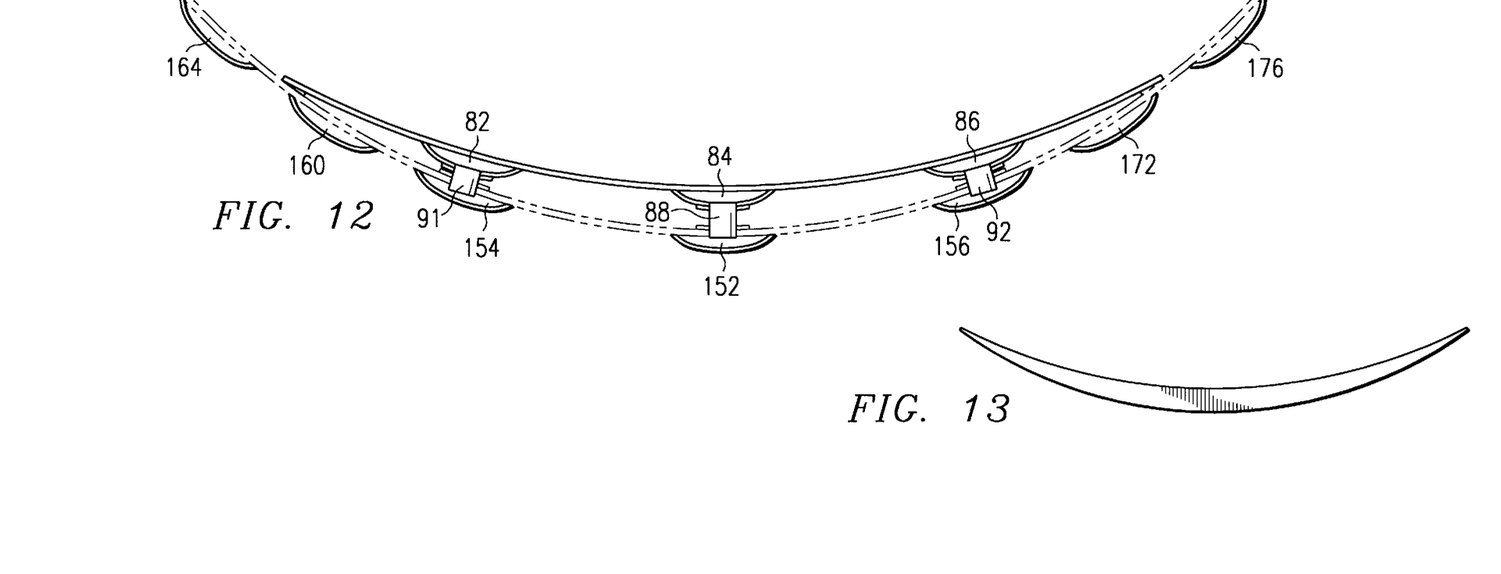
FIG. 12 is a schematic drawing with portions broken away illustrating a cross-section taken through lines 12—12 of FIG. 11.
FIG. 13 is a schematic drawing illustrating a side view of a support member, suitable for use within the teachings of the present invention.

Heat transfer panel 62 is supported in a spaced relation from cylinder 50 at its second end 74, by back support 76. Back support 76 may include an arcuate shaped member which generally conforms to the lower portion 60 of cylinder 50 (FIG. 13). Back support 76 extends axially along cylinder 50, generally perpendicular to longitudinal horizontal axis X. Heat transfer panel 62 may be welded to back support 76 adjacent second end 74 of heat transfer panel 62. Similarly, back support 76 may be welded to the lower portion 60 of cylinder 50, intermediate head 56 and discharge valve 48. In another embodiment, the support member may be formed as an integral component of the heat transfer panel, during fabrication of the heat transfer panel. In the same embodiment, only one weld would be required, at the juncture of the heat transfer panel and lower portion 60 of cylinder 50.

Back support 76 provides additional strength to cylinder 50 and therefore increases the ability of tank 32 to withstand external forces due to impact, squeeze and vacuum conditions. Traditional railway stub sill tank cars are weakest at the points of their tank at the end of the draft sill assemblies.

Back support 76 provides additional reinforcement from which any type of stub sill tank car may benefit. Back support 76 may be selected from various structural materials and configurations. In the illustrated embodiment, back support 76 includes a one and one-half inch thick steel bar, of a generally "half-moon," arcuate shape (FIG. 13). In another embodiment, back support 76 may include a 3×2× ½" angle having a first leg fastened to the lower portion 60 of cylinder 50, and a second leg providing support to second end 74 of heat transfer panel 62, thereby maintaining heat transfer panel 62 in a spaced relation with cylinder 50. An angle back support may provide a thirty percent (30%) greater fatigue life than a bar back support. In still other embodiments, support member 76 may include any type of structural support including, but not limited to, tube steel and "I" beams.

A second heat transfer panel 80 may be disposed within second end 54 of cylinder 50 in a similar manner as heat transfer panel 62. Heat transfer panel 80 is installed similarly, and essentially a mirror image of heat transfer panel 62. Accordingly, only heat transfer panel 62 and its associated ducts and coils will be described in detail except where otherwise appropriate. Heat transfer panels 62 and 80 may be installed within tank 32 during fabrication of railway tank car 30. Alternatively, existing tank cars may be retrofit to include heat transfer panels 62 and 80 of the present invention, at a reasonable cost.

In the illustrated embodiment of FIG. 4, heat transfer panels 62 and 80 are of the mini-panel type, and are disposed at the ends of tank 32 only. In practice, heat transfer panels of various sizes and configurations may be provided within the teachings of the present invention. For example, heat transfer panels associated with railway tank car 30 may be provided of a length approximately one-half of the length of tank 32. In this embodiment, heat transfer panels would extend from each head 56 and 58, and terminate adjacent discharge valve 48. Alternatively, heat transfer panels of any intermediate size may also be provided.

Figure 7:
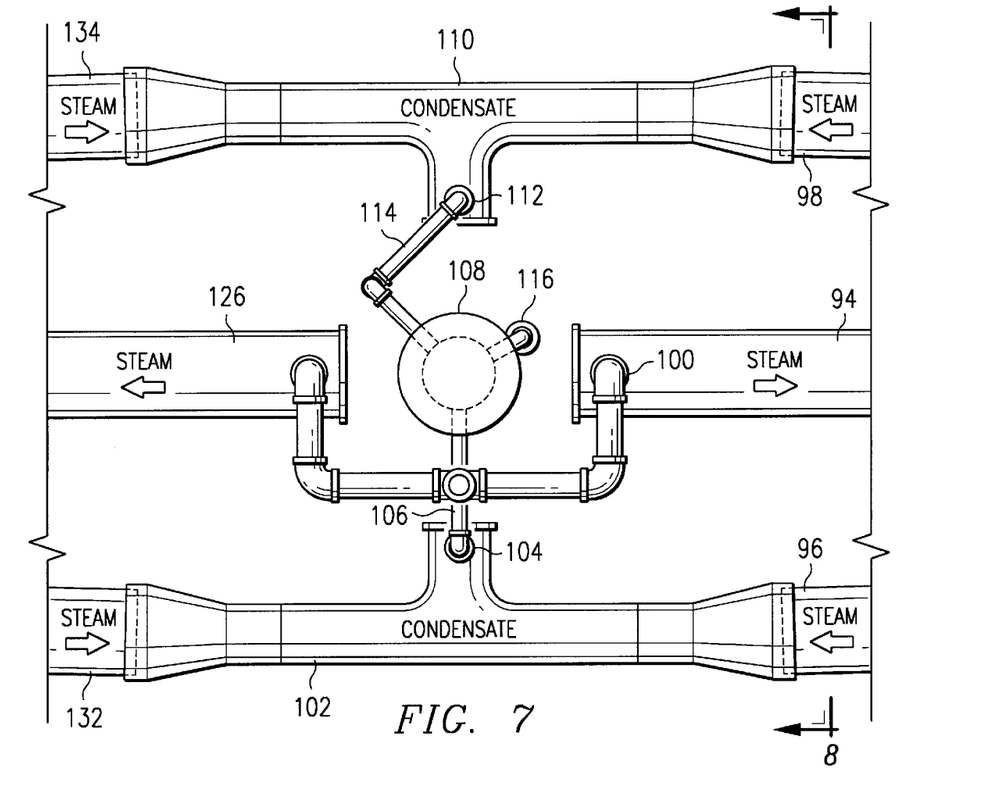
FIG. 7 is a schematic drawing with portions broken away illustrating the piping configuration at a central portion of the railway tank car of FIG. 1.

Referring now to FIGS. 5–7, a plurality of heating coils 82, 84, and 86 may be welded to an underside 78 of heat transfer panel 62. Heating coils 82, 84 and 86 extend approximately the entire longitudinal length of heat transfer panel 62 and include a slope θ with respect to longitudinal axis X. In one embodiment, heat transfer panel 62 may be rolled from a one-quarter inch thick ASTM A-572, Grade 50, Type 2 material, or equal. Heating coils 82, 84 and 86 may be welded to underside 78 and formed from the same material as heat transfer panel 62. Heat transfer ducts, including ducts 94, 96 and 98, which will be described later, in more detail, may also be formed of a similar material.

In the illustrated embodiment, heating coil 84 functions as a steam supply intake and distributes steam to heat transfer panel 62. Steam enters heat transfer panel 62 through a supply manifold 88, which is located adjacent second end 74. Steam travels the longitudinal length of heat transfer panel 62 from second end 74 to first end 64. A transfer conduit 90 collects steam and condensate from heating coil 84 and distributes the steam and condensate to heating coils 82 and 86. Accordingly, heating coils 82 and 86 function as condensate return lines and distribute steam and condensate to return manifolds 91 and 92, respectively. The constant flow of steam and condensate through heat transfer panel 62 and heating coils 82, 84 and 86 maintain heat transfer panel 62 at an elevated temperature. As such, heat is subsequently transferred to the lading within tank 32 to raise the temperature of the lading for efficient unloading.

Manifold 88 establishes fluid communication between heating coil 84 and steam supply duct 94. Similarly, return manifold 91 establishes fluid communication between heating coil 82 and steam return duct 98. Return manifold 92 establishes fluid communication between heating coil 86 and steam return duct 96.

In operation, the heating fluid, for example steam, may enter steam supply duct 94 from an inlet 100 located adjacent discharge valve 48. Steam will then travel within steam supply duct 94 from inlet 100 toward supply manifold 88, and enter heat transfer panel 62. As previously discussed, steam will be distributed throughout the transfer panel 62 and condensate will be returned from return manifolds 91 and 92 to steam condensate return ducts 98 and 96, respectively. Condensate will then travel within steam return duct 96 from return manifold 91 to a "T" connector 102 located adjacent discharge valve 48. Condensate is then discharged through outlet 104 of "T" connector 102 and enters a one-inch pipe 106 which carries condensate to a valve heating donut 108.

In a similar manner, condensate exiting condensate return manifold 92 will travel through steam return duct 96 to a second "T" connector 110, which forms a condensate return. Condensate exits "T" connector 110 through outlet 112 and into one-inch pipe 114, for distribution to valve heating donut 108. Condensate is collected within valve heating donut 108 in order to increase the temperature of discharge valve 48 for efficient unloading of the lading within tank 32. Condensate traveling through valve heating donut 108 will ultimately be discharged to the atmosphere through a two inch outlet pipe 116.

The configuration of heat transfer panel 80 and its associated coils, ducts, and piping are configured and operate similarly to the description above. Steam enters steam intake duct 120 through a steam inlet 122 for distribution to steam intake 124 of heat transfer panel 80. Steam enters steam supply coil 126 through intake manifold 124 for distribution to steam return coils 128 and 130. Steam and condensate are delivered to condensate return ducts 132 and 134 through return manifolds 136 and 138, respectively. Steam and condensate are then distributed through steam return ducts 132 and 134 to "T" connectors 102 and 110, respectively. As previously discussed, steam and condensate are transferred through outlets 104 and 112 to pipes 106 and 114, and ultimately reach valve heating donut 108. Again, condensate is ultimately released to ambient environment through outlet pipe 116.

Additional valves, steam traps and restrictors may be included within the piping configuration of FIG. 4, within the teachings of the present invention. For example, one-quarter inch restrictors may be located on each condensate manifold 91, 92, 136 and 138. Such restrictors operate similarly to steam traps, and increase the pressure of steam within heat transfer panels 62 and 80, to achieve higher temperatures. Similarly, a three-eighth inch restrictor 117 may be located upon outlet pipe 116. The restrictor at each location function as non-mechanical steam traps, and reduce the flow of steam and condensate in order to increase the heating effect. It will be recognized by those of ordinary skill in the art that the size of ducts, coils, pipes and restrictors may be significantly altered within the teachings of the present invention. Accordingly, steam traps may also be placed at any or all of these locations.

In the illustrated embodiment, steam is used as the heating medium and condensate is therefore produced as the steam cools. It will be recognized by those of ordinary skill in the art that other heating media may be used in lieu of steam, within the teachings of the present invention. Furthermore, although this description and figures describe the approximate location at which the steam condenses, this location may be altered significantly by many external factors, and remain within the teachings of the present invention.

Figure 7A:
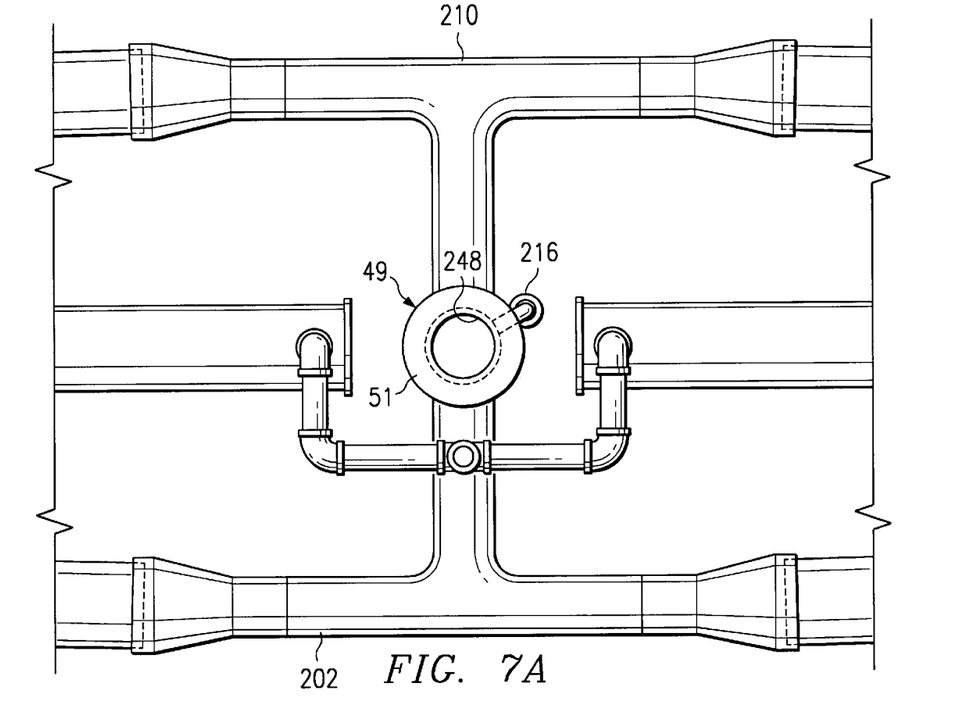
FIG. 7A is a schematic drawing with portions broken away illustrating an alternative embodiment piping configuration for the central portion of the railway tank car of FIG. 1.
Figure 8:
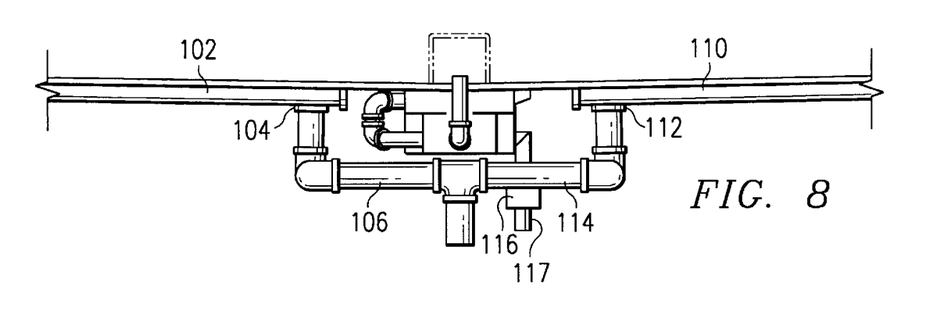
FIG. 8 is a schematic drawing with portions broken away illustrating a cross-section through lines 8—8 of FIG. 7.
Figure 9:
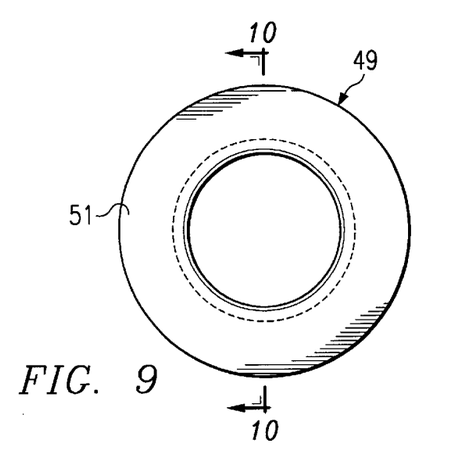
FIG. 9 is a schematic drawing illustrating a top view of a valve heating donut suitable for use within the teachings of the present invention.
Figure 10:
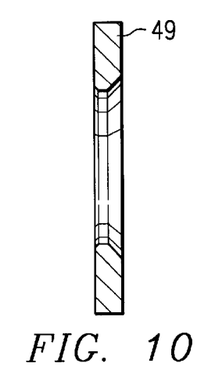
FIG. 10 is a schematic drawing illustrating a cross-section through lines 10—10 of FIG. 9.

FIG. 7A illustrates an alternative embodiment piping configuration adjacent discharge valve 48. In this embodiment, "T" connectors extend into a valve heating donut 49 without intermediate piping. Steam and condensate traveling through "T" connectors 202 and 210 enter an annular fluid passageway 51 within discharge valve 248. Steam is then discharged from valve heating donut 49, through condensate discharge 216. Surrounding discharge valve 248 with heating fluid increases the temperature of the lading nearest discharge valve 248 and enhances the flow of fluid lading through discharge valve 248 during unloading. Additional details regarding valve heating donut 49 are illustrated in FIGS. 9 and 10.

The configuration of ducts 94, 96, and 98, coils 82, 84 and 86, and heat transfer panel 62 may be referred to as a "three pass" system, primarily because of the existence of three ducts 94, 96, and 98 serving the transfer panel 62. Limiting the amount of ducts 94, 96, and 98 to three provides many advantages over traditional railway tank car heating systems. For example, heating is accomplished much more quickly and efficiently in a "three pass" system. Steam has less distance to travel and arrives at each point within the system much more quickly. Also, the reduced number of ducts, reduces the overall weight of railway tank car 30 and provides for reduced time and complications of fabrication. Less parts and pieces are required for assembly of the system. Also, by reducing the overall linear footage of ducts 94, 96, and 98, leakage points and other points of failure are significantly reduced. In order to thoroughly and efficiently heat lading within tank 32, the size, and/or diameter of ducts 94, 96, and 98 may be increased. The location of ducts 94, 96 and 98 provide for simplified identification of leaks and points of failure, and simplified repair and retrofit. In one embodiment, ducts 94, 96, and 98 may be provided with approximately an eight-inch diameter and extend approximately fourteen and one-half feet longitudinally.

The installation of back support 76, heat transfer panel 62 and its associated coils and ducts increase the overall strength of tank 32. For example, the strength of cylinder 50 is dependent upon many factors including the thickness of material, strength of material, diameter of cylinder 50, and the distance between supports, for example truck assemblies 42 and 44. In general, the strength of cylinder 50 will increase with an increase in the thickness of material used to fabricate cylinder 50, and/or a decrease in the diameter of the cylinder, all other factors being equal. Similarly, the thickness of tank 32 is proportional to the cross-sectional area of tank 32. Ducts 94, 96 and 98 and/or the installation of heat transfer panel 62 substantially increases the moment of inertia (cross sectional area x distance squared from the neutral axis). The larger the moment of inertia of tank 32, the greater the ability of tank 32 to withstand large external forces due to impact, squeeze and draft pull conditions. Accordingly, tank 32 may withstand loads that cause fatigue failure, and also resist buckling loads. In one embodiment, the stress at the inboard termination of the stub sill reinforcing plate may be reduced by twenty to twenty five percent, as opposed to a tank without heat transfer panels. In fact, cars of older design may be substantially strengthened by adding heat transfer panels and their associated back supports, coils and ducts.

Figure 11:
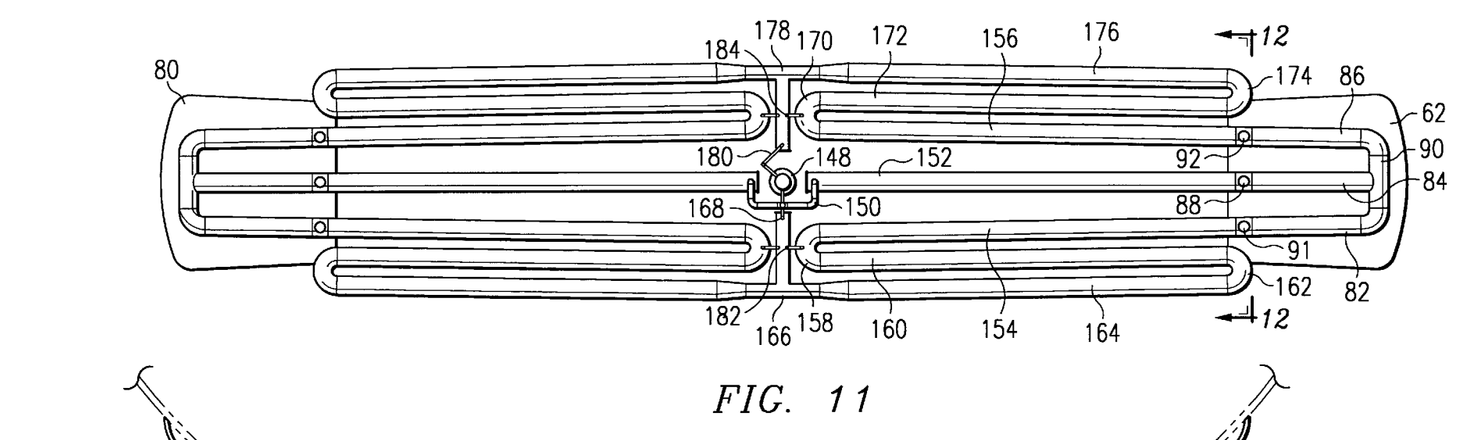
FIG. 11 is a schematic drawing with portions broken away illustrating an alternative embodiment piping configuration suitable for use with the railway tank car of FIG. 1.

Referring now to FIGS. 11 and 12, an alternative duct configuration suitable for use with heat transfer panels 62 and 80 is provided. In this embodiment, heat transfer panels 62 and 80 function similarly and generally form mirror images of one another. Accordingly, the operation of heat transfer panel 62 will be described in detail only, except where otherwise appropriate. Heat transfer panel 62 includes heating coils 82, 84 and 86, in fluid communication with one another through transfer conduit 90. As described above with respect to FIG. 4, steam enters heat transfer panel 62 through supply manifold 88. Condensate leaves heat transfer panel 62 through a pair of return manifolds 91 and 92.

The heating, or heat transfer duct configuration illustrated in FIGS. 11 and 12 may be used for high viscosity lading which requires additional heating prior to unloading. Steam enters this system through a steam intake 150 located adjacent discharge valve 148. Steam supply duct 152 carries steam from steam intake 150 to supply manifold 88 of heat transfer panel 62. Steam supply duct 152 generally includes an elongate, half-oval which extends approximately one-half the length of railway tank car 30. Steam return ducts 154 and 156 are in fluid communication with return manifolds 91 and 92, respectively. Steam traveling through steam return duct 154 encounters a one-hundred eighty degree elbow 158, which diverts steam/condensate into condensate return duct 160. Another one-hundred eighty degree elbow 162 forms a fluid pathway between condensate return duct 160 and condensate return duct 164. Condensate return duct 164 carries condensate for collection at a Tee connector 166 which is located adjacent discharge valve 148, intermediate heat transfer panels 62 and 80. Condensate is discharged from Tee connector 166 through condensate return 168.

In a similar manner, condensate traveling through steam return duct 156 encounters a one-hundred eighty degree elbow 170, which diverts condensate to condensate return duct 172. Another one-hundred eighty-degree elbow 174 provides fluid communication between condensate return duct 172 and condensate return duct 176. Condensate collected at Tee connector 178 is discharged through condensate return 180. Distribution of condensate around discharge valve 148, and the ultimate discharge of condensate from railway tank car 30 is similar to that described above with regard to FIG. 4.

Condensate bypass 182 provides fluid communication between one-hundred eighty degree elbow 158 and Tee connector 166. Similarly, a second condensate bypass 184 provides fluid communication between one-hundred eighty degree elbow 170 and Tee connector 178. Bypasses 182 and 184 improve the heating and efficiency of the heating duct system by providing for the rapid transfer of steam and condensate throughout. Also, bypasses 182 and 184 provide a more efficient method for purging the system of condensate.

In the current state of the art, railway tank car heating systems may include ducts and coils located entirely within, or entirely external to the car. For the purposes of this specification, ducts and coils may be used interchangeably to refer to any fluid pathway for the transfer of steam, condensate or other heating media. In the illustrated embodiment, coils were used to describe fluid pathways, or conduits, associated with the heating panels, while ducts were used to describe the pathways, or conduits associated with the tank. This distinction was made for purposes of clarity only. The hybrid distribution of coils and ducts described within this specification provides many advantages over such systems. By placing ducts, for example, 94, 96 and 98 on the exterior of tank 32, significant savings in volume is realized within tank 32, and the capacity of tank 32 is thereby increased. The installation of heat transfer panels 62 and 80 within tank 32 increases the overall structural strength of tank 32 near its ends 52 and 54, nearest the most critical areas. Also, the location of panels 62 and 80 inside tank 32 improves the efficiency of heat distribution between heat transfer panels 62 and 80 and lading contained within tank 32.

In one embodiment of the present invention, each heating coil and heating duct may include a one-inch positive slope, end-to-end. In excess of 500 lineal feet of coil and duct may be provided, establishing a heating area of approximately 300 square feet.

In the illustrated embodiment, heat transfer panels 62 and 80 are generally spaced from tank 32 to avoid contact. This reduces the heat loss associated with the direct contact of tank 32 through cradles 38 and 40, bolsters 39 and 41, and truck assemblies 42 and 44. The location of heat transfer panel 62 and 80 concentrates heat in the bottom and ends of the car to promote rapid fluidizing of the lading without causing "hot spots" and subsequent burning of the lading.

Although the present invention has been described in detail, it should be understood that various changes, substitutions and alterations can be made hereto without departing from the spirit and scope of the invention as defined by the appended claims.

What is claimed is:

1. A railway tank car, comprising:
   a tank coupled with a first stub sill assembly and a second stub sill assembly, each stub still assembly including a respective tank cradle disposed adjacent to an associated body bolster and railway car truck assembly;
   the tank defined in part by a generally elongated hollow cylinder having first and second ends with a first head and a second head mounted respectively thereon, and a discharge valve for discharging lading disposed upon the cylinder intermediate the first and second heads;
   first and second heat transfer panels each having first and second ends, disposed within the cylinder adjacent the first and second heads;
   the first and second heat transfer panels in fluid communication with first and second pluralities of heat transfer ducts, respectively, operable to provide a heating medium to the first and second heat transfer panels, respectively;
   a first support member disposed intermediate the discharge valve and the first head operable to support the first end of the first heat transfer panel wherein the first end of the first heat transfer panel is spaced from the lower portion of the cylinder; and
   a second support member disposed intermediate the discharge valve and the second head operable to support the first end of the second heat transfer panel wherein the first end of the second heat transfer panel is spaced from the lower portion of the cylinder.

2. The railway tank car of claim 1, wherein the first and second support members each comprise an arcuate shaped bar disposed axially along the lower portion of the cylinder along a plane approximately perpendicular to a longitudinal centerline of the cylinder.

3. The railway tank car of claim 1, wherein the first and second support members each comprise an arcuate shaped angle disposed axially along the lower portion of the cylinder along a plane approximately perpendicular to a longitudinal centerline of the cylinder.

4. The railway tank car of claim 1, wherein each of the first and second heat transfer panels include respective first steam intake coils, and respective second and third condensate return coils.

5. The railway tank car of claim 1, wherein the first and second plurality of heat transfer ducts are each equal to three.

6. The railway tank car of claim 1, wherein the first and second plurality of heat transfer ducts are each equal to seven.

7. The railway tank car of claim 6, wherein the first and second plurality of heat transfer ducts are each disposed upon the exterior of the tank.

8. A railway tank car, comprising:
   a tank coupled with a first stub sill assembly and a second stub sill assembly, each stub still assembly including a respective tank cradle disposed adjacent to an associated body bolster and railway car truck assembly;
   the tank defined in part by a generally elongated hollow cylinder having a first and second ends with a first head and a second head mounted respectively thereon, and a discharge valve for discharging lading disposed upon the cylinder intermediate the first and second heads;
   first and second heat transfer panels each having first and second ends and disposed within the cylinder adjacent the first and second heads, respectively;
   each heat transfer panel including a single respective intake manifold;
   first and second pluralities of exterior heating ducts disposed on an exterior of the cylinder;
   at least one of the first plurality in fluid communication with the single intake manifold associated with the first heat transfer panel; and
   at least one of the second plurality in fluid communication with the single intake manifold associated with the second heat transfer panel.

9. The railway tank car of claim 8, further comprising:
   a first generally arcuate shaped support member disposed upon the lower portion of the cylinder, supporting the first end of the first heat transfer panel in a spaced relation with the lower portion of the cylinder; and
   a second generally arcuate shaped support member supporting the first end of the second heat transfer panel in a spaced relation with the lower portion of the cylinder.

10. The railway tank car of claim 9, wherein the first and second support members are each selected from the group consisting of metal bars, tube steel, "I" beams and metal angles.

11. A railway tank car having a tank mounted on a first stub sill assembly and a second stub sill assembly, each stub sill assembly including a respective tank cradle disposed adjacent to an associated body bolster and railway car truck assembly, the tank defined in part by a generally elongated hollow cylinder having a first end and a second end with a first head and a second head mounted respectively thereon, a discharge valve for discharging lading disposed upon the cylinder intermediate the first head and the second head and a cargo heating system comprising:
   a first heat transfer panel disposed within the cylinder adjacent to the first head;
   the first heat transfer panel engaging the lower portion of the cylinder at a location spaced from the body bolster of the first stub sill assembly to minimize heat loss from the first heat transfer panel to the respective body bolster and railway car truck assembly;
   a second heat transfer panel disposed within the cylinder adjacent to the second head;
   the second heat transfer panel engaging the lower portion of the cylinder at a location spaced from the body bolster of the second stub sill assembly to minimize heat loss from the second heat transfer panel to the respective body bolster and railway car truck assembly;

the first heat transfer panel and the second heat transfer panel each having a respective first supply heating coil and respective second and third return heating coils attached to and communicating with the respective first heating coil;

a respective restrictor disposed between each first heating coil and the respective second and third return heating coils to balance heating fluid flow through to the second and third return heating coils;

first, second, third, fourth, fifth, sixth and seventh heating ducts spaced from each other and attached to an exterior portion of the cylinder and extending longitudinally from a location proximate a midpoint of a longitudinal centerline of the tank to a location proximate the first heat transfer panel;

eighth, ninth, tenth, eleventh, twelfth, thirteenth and fourteenth heating ducts spaced from each other and attached to an exterior portion of the cylinder and extending longitudinally from a location proximate the midpoint of the longitudinal centerline to a location proximate the second heat transfer panel;

each of the ducts having a first end proximate the midpoint of the longitudinal centerline and a second end proximate the respective heat transfer panel;

the first heating duct coupled with the first heating coil of the first heat transfer panel;

the eighth heating duct coupled with the first heating coil of the second heat transfer panel;

each of the first and eighth heating ducts having a respective opening for coupling the first and eighth heating ducts with a source of heating fluid;

the second return heating coil of the first heat transfer panel coupled with the second heating duct;

the third return heating coil of the first heat transfer panel coupled with the third heating duct;

the second return heating coil of the second heat transfer panel coupled with the ninth heating duct;

the third return heating coil of the second heat transfer panel coupled with the tenth heating duct;

the second and ninth heating ducts coupled with the fourth and eleventh heating ducts, respectively, proximate the discharge valve;

the third and tenth heating ducts coupled with the fifth and twelfth heating ducts, respectively, proximate the discharge valve;

the fourth and eleventh heating ducts coupled with the sixth and thirteenth heating ducts, respectively, proximate the respective heat transfer panel;

the fifth and twelfth heating ducts coupled with the seventh and fourteenth heating ducts, respectively, proximate the respective heat transfer panel;

each of the sixth, seventh, thirteenth and fourteenth heating ducts being in fluid communication with at least one heating fluid outlet located proximate the midpoint of the longitudinal centerline; and a respective heating fluid flow path through the first, second, third, fourth, fifth, sixth, seventh, eighth, ninth, tenth, eleventh, twelfth, thirteenth and fourteenth heating ducts.

12. The tank car of claim 11, further comprising:

a substantially annular fluid passageway disposed proximate the midpoint of the longitudinal centerline;

the sixth and seventh exterior duct of the first group of exterior heating ducts and the sixth and seventh exterior duct of the second group of exterior heating ducts in fluid communication with the annual fluid passageway to communicate heating fluid therewith; and the annular fluid passageway having an outlet for releasing condensate from the fluid passageway.

13. The tank car of claim 12, further comprising:

a respective condensate drain line forming a path of fluid communication between each second and third exterior duct at a location proximate the midpoint of the longitudinal centerline; and each condensate drain line in fluid communication with the annular fluid passageway disposed proximate the midpoint of the longitudinal centerline.

14. The tank car of claim 13, wherein each condensate drain line includes a non mechanical restrictor coupled therewith.

15. The tank car of claim 11, further comprising:

each duct having a cross section corresponding generally with one-half of an oval;

each duct having a width of approximately eight inches and a height of approximately one inch; and the configuration and dimensions of each duct selected to provide a relatively thin layer of heating fluid flowing over a relatively large area of the exterior of the cylinder.

16. The tank car of claim 11, further comprising:

a first void space disposed between the first heat transfer panel and adjacent portions of the cylinder; and a second void space disposed between the second heat transfer panel and adjacent portions of the cylinder.

17. The tank car of claim 11, further comprising:

each duct having a center line extending longitudinally therethrough; and the center line of each duct spaced approximately sixteen inches from the center line of an adjacent exterior duct.

18. The tank car of claim 11, further comprising:

a respective conduit attached to and connecting each first duct with the respective first heating coil of the associated heat transfer panel; and each conduit extending through the lower portion of the cylinder adjacent to the associated heat transfer panel.

19. The tank car of claim 11, further comprising:

a respective conduit attached to and connecting each second return coil with the associated second duct; and each conduit extending through the lower portion of the cylinder adjacent to the associated heat transfer panel.

20. The tank car of claim 11, further comprising:

a respective conduit attached to and connecting each third return coil with the associated third duct; and each conduit extending through the lower portion of the cylinder adjacent to the associated heat transfer panel.

* * * * *